(12) United States Patent
Nangare et al.

(10) Patent No.: US 12,284,059 B1
(45) Date of Patent: Apr. 22, 2025

(54) NON-LINEAR NEURAL NETWORK EQUALIZER FOR HIGH-SPEED DATA CHANNEL

(71) Applicant: Marvell Asia Pte Ltd, Singapore (SG)

(72) Inventors: Nitin Nangare, Sunnyvale, CA (US); Ahmed Medhat Ahmed Fahmi Eid Aboutaleb, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 51 days.

(21) Appl. No.: 17/648,831

(22) Filed: Jan. 25, 2022

Related U.S. Application Data

(60) Provisional application No. 63/147,106, filed on Feb. 8, 2021.

(51) Int. Cl.
*H04L 25/02* (2006.01)
*H04L 25/03* (2006.01)

(52) U.S. Cl.
CPC ...... *H04L 25/0254* (2013.01); *H04L 25/0234* (2013.01); *H04L 25/0252* (2013.01); *H04L 25/03878* (2013.01)

(58) Field of Classification Search
None
See application file for complete search history.

(56) References Cited

U.S. PATENT DOCUMENTS 5,963,929 A   10/1999  Lo
5,991,308 A * 11/1999  Fuhrmann ............... H04J 13/00
                                                          348/E7.07

(Continued)

FOREIGN PATENT DOCUMENTS

AU   2004231907        11/2004
AU   2004231907 B2 *   12/2009   ........ H03M 13/2975

(Continued)

OTHER PUBLICATIONS

Z. Zerdoumi, D. Chikouche and D. Benatia, "Adaptive decision feedback equalizer based neural network for nonlinear channels," 3rd International Conference on Systems and Control, Algiers, Algeria, 2013, pp. 850-855, doi: 10.1109/ICoSC.2013.6750956. (Year: 2013).*

(Continued)

*Primary Examiner* — Berhanu Tadese

(57) ABSTRACT

A data channel on an integrated circuit device includes a non-linear equalizer having as inputs digitized samples of signals on the data channel, decoding circuitry configured to determine from outputs of the non-linear equalizer a respective value of each of the signals, and adaptation circuitry configured to adapt parameters of the non-linear equalizer based on respective ones of the value. The non-linear equalizer includes a non-linear filter portion, and a front-end filter portion configured to reduce numbers of the inputs from the digitized samples. The non-linear equalizer may be a neural network equalizer, such as a multi-layer perceptron neural network equalizer, a reduced complexity multi-layer perceptron neural network equalizer, or a radial-basis function neural network equalizer. Alternatively, the non-linear equalizer may include a linear filter and a non-linear activation function, which may be a hyperbolic tangent function.

20 Claims, 12 Drawing Sheets

(56) References Cited

U.S. PATENT DOCUMENTS

| | | | | |
|---|---|---|---|---|
| 6,052,349 A * | 4/2000 | Okamoto | G11B 20/10055 | 369/47.26 |
| 6,158,271 A * | 12/2000 | de Corral | G01N 11/08 | 73/861.51 |
| 6,236,749 B1 * | 5/2001 | Satonaka | G06V 10/751 | 382/250 |
| 6,246,962 B1 * | 6/2001 | Schultz | G01V 1/48 | 702/6 |
| 6,304,539 B1 * | 10/2001 | Okamoto | G11B 20/10009 | 369/59.22 |
| 6,307,868 B1 * | 10/2001 | Rakib | H04L 5/06 | 375/325 |
| 6,377,640 B2 * | 4/2002 | Trans | H04L 1/0047 | 375/354 |
| 6,381,083 B1 * | 4/2002 | Abarbanel | H04L 25/03165 | |
| 6,434,084 B1 | 8/2002 | Schultz et al. | | |
| 6,665,308 B1 * | 12/2003 | Rakib | H04L 27/362 | 370/479 |
| 6,687,235 B1 * | 2/2004 | Chu | H04B 3/23 | 379/406.01 |
| 6,831,900 B2 * | 12/2004 | Blake | H04B 3/23 | 370/290 |
| 6,937,617 B2 * | 8/2005 | Rakib | H04N 7/10 | 370/479 |
| 6,983,047 B1 * | 1/2006 | Chadha | H04B 3/23 | 379/406.01 |
| 7,016,440 B1 * | 3/2006 | Singer | H04L 25/03171 | 375/348 |
| 7,020,165 B2 * | 3/2006 | Rakib | H03M 13/256 | 348/E7.07 |
| 7,031,344 B2 * | 4/2006 | Rakib | H04L 25/4921 | 370/479 |
| 7,095,707 B2 * | 8/2006 | Rakib | H04N 7/17309 | 370/204 |
| 7,158,566 B2 * | 1/2007 | Dowling | H04L 25/03057 | 375/229 |
| 7,239,650 B2 * | 7/2007 | Rakib | H04L 5/026 | 370/480 |
| 7,454,684 B2 * | 11/2008 | Allpress | H03M 13/2993 | 714/755 |
| 7,764,622 B2 * | 7/2010 | El-Damhougy | H04B 7/18584 | 370/252 |
| 7,885,031 B1 * | 2/2011 | Han | G11B 20/10046 | 360/25 |
| 8,046,200 B2 * | 10/2011 | Kirby | G06F 17/175 | 703/2 |
| 8,107,329 B1 * | 1/2012 | Painter | G11B 7/0906 | 369/44.41 |
| 8,363,517 B1 * | 1/2013 | Painter | G11B 20/10037 | 369/44.14 |
| 8,416,659 B1 * | 4/2013 | Xie | G11B 20/10046 | 369/47.17 |
| 8,521,488 B2 * | 8/2013 | Kirby | G06F 17/175 | 703/2 |
| 8,611,411 B2 * | 12/2013 | Hayami | G11B 20/10009 | 375/232 |
| 8,634,284 B1 * | 1/2014 | Painter | G11B 7/0908 | 369/44.41 |
| 8,896,682 B2 * | 11/2014 | Bressler | A61B 3/0025 | 348/78 |
| 9,484,974 B2 * | 11/2016 | Tu | H04B 1/123 | |
| 9,754,163 B2 * | 9/2017 | Segalovitz | G06T 5/92 | |
| 9,928,824 B2 * | 3/2018 | Barath | G10K 11/17854 | |
| 10,038,575 B1 | 7/2018 | Steffan et al. | | |
| 10,147,442 B1 * | 12/2018 | Panchapagesan | G06N 3/04 | |
| 10,388,272 B1 * | 8/2019 | Thomson | G10L 15/22 | |
| 10,475,471 B2 * | 11/2019 | Ebenezer | G10L 25/21 | |
| 10,531,415 B2 * | 1/2020 | O'Shea | G06N 20/00 | |
| 10,573,312 B1 * | 2/2020 | Thomson | G10L 15/22 | |
| 10,672,383 B1 * | 6/2020 | Thomson | G06N 20/00 | |
| 10,797,805 B1 | 10/2020 | Mirfakhraei et al. | | |
| 10,833,785 B1 | 11/2020 | O'Shea et al. | | |
| 10,847,137 B1 * | 11/2020 | Mandal | G10L 15/16 | |
| 10,971,153 B2 * | 4/2021 | Thomson | G10L 15/30 | |
| 10,979,097 B2 * | 4/2021 | Luo | H04L 25/0254 | |
| 10,985,951 B2 * | 4/2021 | Li | G06N 3/045 | |
| 11,017,778 B1 * | 5/2021 | Thomson | H04M 3/42382 | |
| 11,050,494 B2 | 6/2021 | Baek et al. | | |
| 11,055,615 B2 * | 7/2021 | Litichever | H04L 12/40 | |
| 11,074,495 B2 * | 7/2021 | Zadeh | G06F 18/2413 | |
| 11,074,925 B2 * | 7/2021 | Bryan | G06N 20/00 | |
| 11,145,312 B2 * | 10/2021 | Thomson | G10L 15/32 | |
| 11,145,331 B1 * | 10/2021 | Nangare | G11B 20/10046 | |
| 11,170,761 B2 * | 11/2021 | Thomson | G10L 15/06 | |
| 11,195,057 B2 * | 12/2021 | Zadeh | G06N 3/006 | |
| 11,240,579 B2 * | 2/2022 | Jumbe | A61B 5/0531 | |
| 11,255,663 B2 * | 2/2022 | Binder | G01B 15/00 | |
| 11,270,200 B2 | 3/2022 | Zhang et al. | | |
| 11,271,699 B1 * | 3/2022 | Eyuboglu | H04L 1/1819 | |
| 11,310,084 B2 * | 4/2022 | Shen | H04L 25/0212 | |
| 11,356,182 B2 * | 6/2022 | Ye | H04B 10/272 | |
| 11,438,014 B2 * | 9/2022 | Belzer | H03M 13/6325 | |
| 11,451,419 B2 * | 9/2022 | Li | H04B 1/16 | |
| 11,495,248 B2 * | 11/2022 | Musha | G11B 5/4893 | |
| 11,496,341 B2 * | 11/2022 | Luo | G06N 3/084 | |
| 11,509,509 B2 * | 11/2022 | Razavi Majomard | H04L 25/03885 | |
| 11,516,053 B2 * | 11/2022 | Ye | H04L 25/03159 | |
| 11,568,214 B2 * | 1/2023 | Tullberg | G06N 5/01 | |
| 11,570,023 B2 * | 1/2023 | Nangare | H04L 25/03057 | |
| 11,575,544 B2 * | 2/2023 | Andrews | G06N 3/084 | |
| 11,677,595 B2 * | 6/2023 | Razavi Majomard | H04B 3/14 | 375/232 |
| 2001/0034216 A1 | 10/2001 | Creigh et al. | | |
| 2002/0150059 A1 * | 10/2002 | Blake | H04B 3/23 | 370/286 |
| 2002/0181633 A1 * | 12/2002 | Trans | H04L 1/0002 | 375/354 |
| 2004/0260995 A1 * | 12/2004 | Allpress | H03M 13/2975 | 714/755 |
| 2005/0220185 A1 * | 10/2005 | Dowling | H04L 25/03057 | 375/232 |
| 2006/0039550 A1 * | 2/2006 | Chadha | H04B 3/23 | 379/406.09 |
| 2008/0319375 A1 * | 12/2008 | Hardy | B82Y 5/00 | 600/431 |
| 2014/0146867 A1 | 5/2014 | Shvydun et al. | | |
| 2018/0102136 A1 | 4/2018 | Ebenezer | | |
| 2018/0115824 A1 * | 4/2018 | Cassidy | H04R 3/007 | |
| 2018/0204111 A1 * | 7/2018 | Zadeh | G06V 10/764 | |
| 2019/0154439 A1 * | 5/2019 | Binder | G01S 15/08 | |
| 2019/0365342 A1 * | 12/2019 | Ghaffarzadegan | A61B 7/04 | |
| 2019/0385057 A1 * | 12/2019 | Litichever | H04L 63/14 | |
| 2020/0184278 A1 * | 6/2020 | Zadeh | G06N 3/044 | |
| 2020/0250497 A1 * | 8/2020 | Peng | G06V 10/764 | |
| 2020/0293894 A1 * | 9/2020 | Kwon | G06N 3/08 | |
| 2020/0294401 A1 * | 9/2020 | Kerecsen | G08G 1/205 | |
| 2020/0295975 A1 | 9/2020 | Li et al. | | |
| 2020/0389469 A1 * | 12/2020 | Litichever | H04W 4/40 | |
| 2021/0091979 A1 * | 3/2021 | Ye | H04L 25/03012 | |
| 2021/0142158 A1 * | 5/2021 | Agrawal | H03M 13/1111 | |
| 2021/0218606 A1 * | 7/2021 | Shen | H04L 25/0212 | |
| 2021/0345939 A1 * | 11/2021 | Jumbe | H04R 1/028 | |
| 2021/0350237 A1 * | 11/2021 | Litichever | G06N 3/08 | |
| 2021/0399927 A1 * | 12/2021 | Razavi Majomard | H04B 3/32 | |
| 2022/0014401 A1 | 1/2022 | Zhu et al. | | |
| 2022/0014404 A1 * | 1/2022 | Hossain | H04L 27/2337 | |
| 2022/0128352 A1 * | 4/2022 | Binder | G01B 15/00 | |
| 2022/0131724 A1 * | 4/2022 | Razavi Majomard | H04L 25/03044 | |
| 2022/0150094 A1 * | 5/2022 | Nangare | H04L 25/03885 | |
| 2022/0224361 A1 | 7/2022 | Alic et al. | | |
| 2022/0239510 A1 * | 7/2022 | Nangare | H04L 25/0252 | |
| 2022/0385374 A1 * | 12/2022 | Arikawa | H04B 10/616 | |
| 2023/0021633 A1 * | 1/2023 | Li | H04L 25/03165 | |
| 2023/0216724 A1 * | 7/2023 | Sundberg | H04L 27/3483 | 370/329 |

(56) References Cited

U.S. PATENT DOCUMENTS

| | | | | |
|---|---|---|---|---|
| 2023/0275787 | A1* | 8/2023 | Vitthaladevuni | H04L 25/0254 706/23 |
| 2024/0064045 | A1* | 2/2024 | Dufrene | H04L 25/0224 |

FOREIGN PATENT DOCUMENTS

| | | | | |
|---|---|---|---|---|
| AU | 2020101786 | | 9/2020 | |
| AU | 2020101786 | A4 * | 9/2020 | |
| CN | 116054888 | A * | 5/2003 | |
| CN | 1485798 | | 3/2004 | |
| CN | 1485798 | A * | 3/2004 | |
| CN | 107342814 | | 11/2017 | |
| CN | 107342814 | A * | 11/2017 | H04B 10/116 |
| CN | 108363967 | | 8/2018 | |
| CN | 108363967 | A * | 8/2018 | |
| CN | 108399366 | | 8/2018 | |
| CN | 108399366 | A * | 8/2018 | |
| CN | 108650201 | A * | 10/2018 | H04L 25/03006 |
| CN | 109379120 | | 2/2019 | |
| CN | 109379120 | A * | 2/2019 | H04B 7/0413 |
| CN | 109753978 | | 5/2019 | |
| CN | 109995449 | A * | 7/2019 | G06N 3/0454 |
| CN | 110198282 | | 9/2019 | |
| CN | 110211611 | A * | 9/2019 | |
| CN | 110233812 | A * | 9/2019 | G06K 9/6223 |
| CN | 110326308 | | 10/2019 | |
| CN | 110326308 | A * | 10/2019 | G06N 20/00 |
| CN | 110365613 | | 10/2019 | |
| CN | 110365613 | A * | 10/2019 | |
| CN | 110392006 | A * | 10/2019 | G06N 20/20 |
| CN | 110399929 | A * | 11/2019 | G06F 18/241 |
| CN | 110446160 | | 11/2019 | |
| CN | 110446160 | A * | 11/2019 | |
| CN | 110533027 | A * | 12/2019 | G06F 18/214 |
| CN | 110547824 | | 12/2019 | |
| CN | 110547824 | A * | 12/2019 | A61B 5/7267 |
| CN | 110598859 | | 12/2019 | |
| CN | 110598859 | A * | 12/2019 | G06N 3/0445 |
| CN | 108683428 | | 4/2020 | |
| CN | 108683428 | B * | 4/2020 | G06F 21/44 |
| CN | 111191573 | | 5/2020 | |
| CN | 111191573 | A * | 5/2020 | |
| CN | 110198282 | B * | 6/2020 | H04L 25/03012 |
| CN | 110211611 | | 6/2020 | |
| CN | 111630787 | | 9/2020 | |
| CN | 111630787 | A * | 9/2020 | G06N 3/0454 |
| CN | 111683025 | | 9/2020 | |
| CN | 111683025 | A * | 9/2020 | G06N 3/044 |
| CN | 111740934 | A * | 10/2020 | G06N 3/0454 |
| CN | 108650201 | | 11/2020 | |
| CN | 109995449 | | 12/2020 | |
| CN | 110636020 | | 1/2021 | |
| CN | 110636020 | B * | 1/2021 | G06N 3/084 |
| CN | 110197218 | | 2/2021 | |
| CN | 111565160 | | 3/2021 | |
| CN | 111565160 | B * | 3/2021 | |
| CN | 112532548 | | 3/2021 | |
| CN | 112532548 | A * | 3/2021 | G06N 3/045 |
| CN | 110808932 | B * | 4/2021 | G06F 17/18 |
| CN | 110325929 | | 5/2021 | |
| CN | 110325929 | B * | 5/2021 | G05B 19/042 |
| CN | 109067688 | | 9/2021 | |
| CN | 109067688 | B * | 9/2021 | H04L 25/025 |
| CN | 110392006 | | 1/2022 | |
| CN | 111488734 | | 2/2022 | |
| CN | 111488734 | B * | 2/2022 | G06F 16/35 |
| CN | 110505020 | B * | 3/2022 | G06N 3/08 |
| CN | 114342272 | | 4/2022 | |
| CN | 114342272 | A * | 4/2022 | H04B 1/0475 |
| CN | 114664288 | | 6/2022 | |
| CN | 114664288 | A * | 6/2022 | |
| CN | 111740934 | | 8/2022 | |
| CN | 110533027 | | 9/2022 | |
| CN | 111565051 | | 11/2022 | |
| CN | 111565051 | B * | 11/2022 | H03M 13/1148 |
| CN | 111630787 | B * | 12/2022 | G06N 3/0454 |
| CN | 109753978 | B * | 2/2023 | G06F 18/241 |
| CN | 111786915 | | 3/2023 | |
| CN | 111786915 | B * | 3/2023 | H04B 7/0854 |
| CN | 110399929 | | 4/2023 | |
| CN | 116054888 | | 5/2023 | |
| CN | 110741553 | | 11/2023 | |
| CN | 110741553 | B * | 11/2023 | G06N 3/0445 |
| CN | 112532548 | B * | 2/2024 | G06N 3/045 |
| DE | 69620781 | | 5/2007 | |
| DE | 69620781 | T9 * | 5/2007 | H03M 13/256 |
| DE | 112021005915 | | 8/2023 | |
| DE | 112021005915 | T5 * | 8/2023 | H04L 25/03057 |
| EP | 1107597 | | 6/2001 | |
| EP | 1107597 | A2 * | 6/2001 | H03M 13/256 |
| EP | 1107598 | | 6/2001 | |
| EP | 1107598 | A2 * | 6/2001 | H03M 13/256 |
| EP | 1107599 | | 6/2001 | |
| EP | 1130918 | | 9/2001 | |
| EP | 1130918 | A2 * | 9/2001 | H03M 13/256 |
| EP | 1130919 | | 9/2001 | |
| EP | 1130919 | A2 * | 9/2001 | H03M 13/256 |
| EP | 1187360 | | 3/2002 | |
| EP | 1107599 | B1 * | 3/2006 | H03M 13/256 |
| EP | 2 148 446 | | 1/2010 | |
| EP | 1107598 | B1 * | 7/2010 | H03M 13/256 |
| EP | 3535625 | | 2/2021 | |
| EP | 3993275 | | 5/2022 | |
| EP | 4088385 | | 11/2022 | |
| EP | 3673580 | | 10/2023 | |
| EP | 3673580 | B1 * | 10/2023 | G06N 3/04 |
| EP | 4270381 | | 11/2023 | |
| EP | 4270381 | A2 * | 11/2023 | G10K 11/17823 |
| FR | 3118519 | | 7/2022 | |
| FR | 3118519 | A1 * | 7/2022 | G06N 3/045 |
| GB | 2557425 | | 6/2018 | |
| GB | 2557425 | B * | 2/2020 | G10L 15/02 |
| JP | 10106158 | A * | 4/1998 | G11B 20/10009 |
| JP | 2002141829 | | 5/2002 | |
| JP | 3507080 | | 3/2004 | |
| JP | 3507080 | B2 * | 3/2004 | H03M 13/256 |
| JP | 3764269 | | 4/2006 | |
| JP | 3764269 | B2 * | 4/2006 | G06N 3/049 |
| JP | 4314553 | | 8/2009 | |
| JP | 2019-530113 | | 10/2019 | |
| JP | 2019530113 | A * | 10/2019 | G06N 3/063 |
| KR | 2009109380 | A * | 10/2009 | |
| WO | WO 1997/08861 | | 3/1997 | |
| WO | WO-9708861 | A1 * | 3/1997 | H03M 13/256 |
| WO | WO 2004/095711 | | 11/2004 | |
| WO | WO-2004095711 | A1 * | 11/2004 | H03M 13/2975 |
| WO | WO 2008/157422 | | 12/2008 | |
| WO | WO-2008157422 | A1 * | 12/2008 | A61K 41/0028 |
| WO | WO-2020117504 | A1 * | 6/2011 | G06F 21/6245 |
| WO | WO-2015198271 | A1 * | 12/2015 | G11B 20/10009 |
| WO | WO 2016/040583 | | 3/2016 | |
| WO | WO 2016/040590 | | 3/2016 | |
| WO | WO 2016/040644 | | 3/2016 | |
| WO | WO-2016040583 | A1 * | 3/2016 | H04B 1/123 |
| WO | WO-2016040590 | A1 * | 3/2016 | H04B 1/40 |
| WO | WO-2016040644 | A1 * | 3/2016 | H04B 1/525 |
| WO | WO 2016/108166 | | 7/2016 | |
| WO | WO-2016108166 | A1 * | 7/2016 | G10K 11/17823 |
| WO | WO 2017/149526 | | 9/2017 | |
| WO | WO-2017149526 | A3 * | 10/2017 | G01B 11/026 |
| WO | WO 2018/071387 | | 4/2018 | |
| WO | WO-2018071387 | A1 * | 4/2018 | G10L 15/02 |
| WO | WO 2018/104929 | | 6/2018 | |
| WO | WO-2018104929 | A1 * | 6/2018 | G05B 19/042 |
| WO | WO-2019038693 | A1 * | 2/2019 | G06N 3/04 |
| WO | WO 2019/043446 | | 3/2019 | |
| WO | WO-2019043446 | A1 * | 3/2019 | G05D 1/0287 |
| WO | WO 2019/082239 | | 5/2019 | |
| WO | WO 2019/165969 | | 9/2019 | |
| WO | WO 2019/169400 | | 9/2019 | |
| WO | WO-2019043466 | A1 * | 9/2019 | G06Q 20/065 |
| WO | WO-2019082239 | A1 * | 9/2019 | |
| WO | WO-2019165969 | A1 * | 9/2019 | H04L 25/03012 |

(56) References Cited

FOREIGN PATENT DOCUMENTS

| WO | WO-2019169400 A1 | * | 9/2019 | ............. G06N 20/00 |
|---|---|---|---|---|
| WO | WO-2019191099 A1 | * | 10/2019 | |
| WO | WO-2019242534 A1 | * | 12/2019 | .......... H04B 10/0795 |
| WO | WO 2020092391 | | 5/2020 | |
| WO | WO-2020092391 A1 | * | 5/2020 | ........... G06N 3/0455 |
| WO | WO 2020/117504 | | 6/2020 | |
| WO | WO 2020/117505 | | 6/2020 | |
| WO | WO 2020/117506 | | 6/2020 | |
| WO | WO 2020/117507 | | 6/2020 | |
| WO | WO-2020117505 A1 | * | 6/2020 | ............. G10L 15/22 |
| WO | WO-2020117506 A1 | * | 6/2020 | ............ G10L 15/187 |
| WO | WO-2020117507 A1 | * | 6/2020 | ............ G10L 15/063 |
| WO | WO 2021045862 | | 3/2021 | |
| WO | WO-2021045862 A1 | * | 3/2021 | ............ H04B 1/0475 |
| WO | WO 2021142189 | | 7/2021 | |
| WO | WO-2021142189 A1 | * | 7/2021 | .............. H04B 3/23 |
| WO | WO 2021203242 | | 10/2021 | |
| WO | WO-2021203242 A1 | * | 10/2021 | ........... G06N 3/0454 |
| WO | WO 2021262052 | | 12/2021 | |
| WO | WO-2021262052 A1 | * | 12/2021 | ............. G06N 3/045 |
| WO | WO 2021262811 | | 12/2021 | |
| WO | WO-2021262811 A1 | * | 4/2022 | .............. H04B 3/23 |
| WO | WO 2022087388 | | 4/2022 | |
| WO | WO-2022087388 A1 | * | 4/2022 | .............. H04B 3/14 |
| WO | WO-2022103422 A1 | * | 5/2022 | ....... H04L 25/03057 |
| WO | WO-2022159870 A1 | * | 7/2022 | ............. G06N 3/048 |

OTHER PUBLICATIONS

J. K. Satapathy, K. R. Subhashini and G. Lalitha Manohar, "A highly efficient channel equalizer for digital communication system in Neural Network paradigm," 2009 Innovative Technologies in Intelligent Systems and Industrial Applications, Kuala Lumpur, Malaysia, 2009, pp. 11-16, (Year: 2009).*

Sheeja, K.L., et al., "Decision Feedback Equalization Using RBF and MLP Networks," *2010 Second Vaagdevi International Conference on Information Technology for Real World Problems (VCON)*, IEEE, pp. 96-101 (Dec. 9, 2010).

Zerdoumi, Z., et al., "Adaptive Decision Feedback Equalizer Based Neural Network for Nonlinear Channels," *Proceedings of the 3rd International Conference on Systems and Control*, Oct. 29-31, 2013 (6 pages).

Zhou, Qingyi, et al., "AdaNN: Adaptive Neural Network-based Equalizer via Online Semi-supervised Learning," ARXIV.Org, Cornell University Library, Jul. 24, 2019 (10 pages).

Shen, J., et al., "Nonlinear Equalization for TDMR Channels Using Neural Networks", *2020 54th Annual Conference on Information Sciences and Systems (CISS)*, IEEE, pp. 1-6 (Mar. 18, 2020).

Santamaria, I., et al., "Entropy Minimization for Supervised Digital Communications Channel Equalization", *IEEE Transactions on Signal Processing*, 50(5):1184-92 (May 2002).

Chen, S., et al., "A Clustering Technique for Digital Communications Channel Equalization Using Radial Basis Function Networks", *IEEE Transactions on Neural Networks*, 4(4):570-90 (Jul. 1993).

Gonzalez-Serrano, F.J., et al., "Reduced-Complexity Decision-Feedback Equalizer for Nonlinear Channels", *9th European Signal Processing Conference (EUSIPCO)*, pp. 1-4, (1998).

* cited by examiner

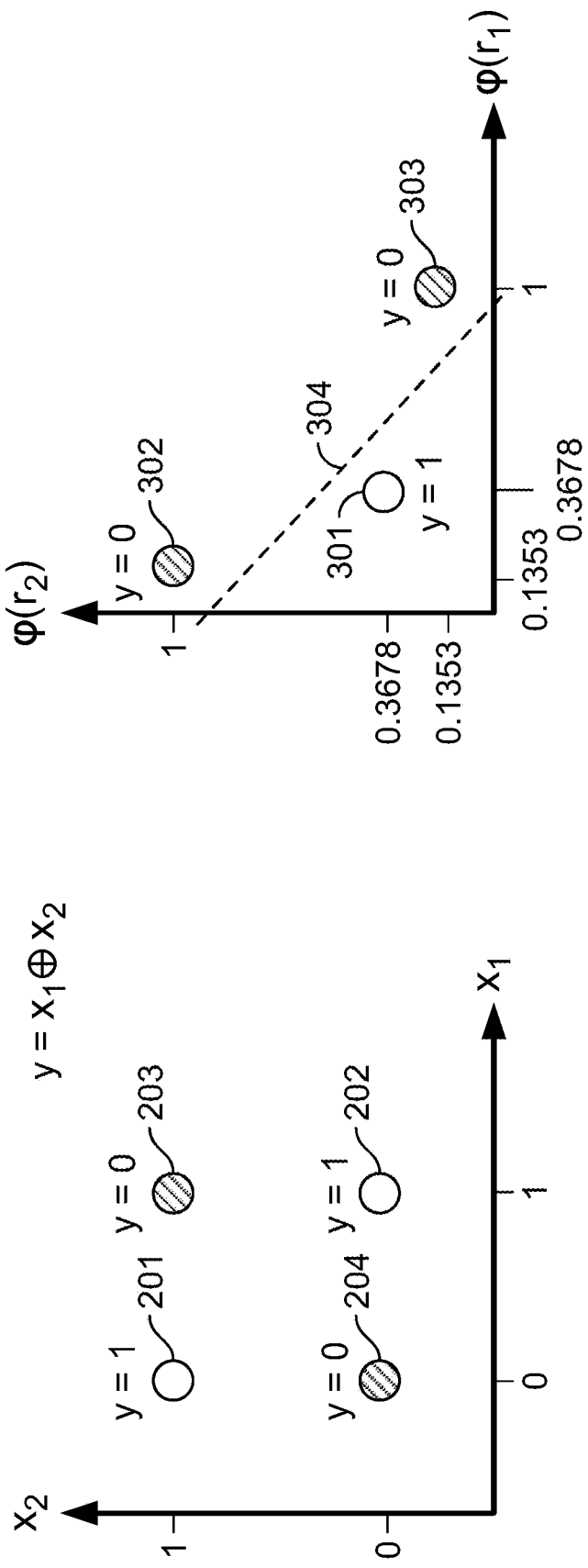

NON-LINEAR NEURAL NETWORK EQUALIZER FOR HIGH-SPEED DATA CHANNEL

CROSS REFERENCE TO RELATED APPLICATION

This disclosure claims the benefit of copending, commonly-assigned U.S. Provisional Patent Application No. 63/147,106, filed Feb. 8, 2021, which is hereby incorporated by reference herein in its entirety.

FIELD OF USE

This disclosure relates to the use of non-linear equalizers in a high-speed data channel. More particularly, this disclosure relates to the use of non-linear neural-network equalizers in the receiver side of a high-speed SERDES (serializer-deserializer) channel on an integrated circuit device, or in the read channel of a storage device controller.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Many integrated circuit devices, particularly "systems-on-chip" (SoCs), include high-speed serial links between various device components (such as the individual silicon dice in an SoC). Typical high-speed serial links of that type, commonly known as "SERDES" (serializer/deserializer), may suffer from significant non-linearity or channel impairment in the signal path, as a result of, e.g., insertion loss, inter-symbol-interference (ISI), and, in an optical system, non-linearities such as dispersion loss, or, in a copper (i.e., wired) system, cross-talk, jitter, etc. Various forms of linear equalization typically are used, at the receiver end of such links, to attempt to mitigate such channel impairments. However, linear equalization may not be sufficient to compensate for such non-linearities, particularly when the data levels to be distinguished are close together.

Similarly, in magnetic recording, reading and writing are performed by a head of a hard disk drive that moves relative to the surface of a storage medium and writes data to, or reads data from, circular data tracks on a magnetic disk. In order to increase recording densities, it is desirable to shrink the bit cell, or area of disk surface in which a single bit is recorded. Shrinking the bit cell, however, increases inter-symbol interference (ISI) from data recorded on the media, thereby increasing the bit error rate (BER) and decreasing the reliability of read-back data. An increased BER also effectively reduces the rate at which data can be read back, owing to the overhead inherent in error-detection or error-correction techniques employed to compensate for the increased BER, and/or owing to repeat read-back attempts that may be necessary in order to accurately read-back data after erroneous data read-back attempts.

SUMMARY

In accordance with implementations of the subject matter of this disclosure, a data channel on an integrated circuit device includes a non-linear equalizer having as inputs digitized samples of signals on the data channel, decoding circuitry configured to determine from outputs of the non-linear equalizer a respective value of each of the signals, and adaptation circuitry configured to adapt parameters of the non-linear equalizer based on respective ones of the value. The non-linear equalizer includes a non-linear filter portion, and a front-end filter portion configured to reduce numbers of the inputs from the digitized samples.

In a first implementation of such a data channel, the non-linear equalizer may be a neural network equalizer.

According to a first aspect of that first implementation, the neural network equalizer may be a multi-layer perceptron neural network equalizer.

In one instance of that first aspect of the first implementation, the multi-layer perceptron neural network equalizer may be a reduced complexity multi-layer perceptron neural network equalizer.

According to a second aspect of the first implementation, the neural network equalizer may be a radial-basis function neural network equalizer.

In a second implementation of such a data channel, the non-linear equalizer may include a linear filter and a non-linear activation function.

According to a first aspect of that second implementation, the non-linear activation function may be a hyperbolic tangent function.

In a third implementation of such a data channel, the adaptation circuitry may adapt parameters of the non-linear equalizer based on cross-entropy.

In a fourth implementation of such a data channel, the front-end filter portion may include a FIR filter.

A fifth implementation of such a data channel may include scalable bypass circuitry for controllably outputting output of the front-end filter portion as at least a portion of output of the non-linear equalizer.

A method according to implementations of the subject matter of this disclosure for detecting data on a data channel on an integrated circuit device includes performing non-linear equalization of digitized samples of input signals on the data channel, determining from output signals of the non-linear equalization a respective value of each of the output signals, and adapting parameters of the non-linear equalization based on respective ones of the value. Performing non-linear equalization of digitized samples of input signals on the data channel includes performing front-end filtering to reduce numbers of the inputs from the digitized samples, and performing non-linear filtering on the reduced number of inputs from the digitized samples In a first implementation of such a method, performing non-linear equalization may include performing neural network equalization.

According to a first aspect of that first implementation, performing neural network equalization may include applying a multi-layer perceptron neural network equalizer.

In a first instance of that first aspect of the first implementation, performing neural network equalization may include applying a reduced complexity multi-layer perceptron neural network equalizer.

According to a second aspect of the first implementation, performing neural network equalization may include applying a radial-basis function neural network equalizer.

In a second implementation of such a method, performing non-linear equalization may include applying a non-linear activation function and performing linear filtering on output of the non-linear activation function.

According to a first aspect of that second implementation, applying a non-linear activation function may include applying a hyperbolic tangent function.

In a third implementation of such a method, adapting parameters of the non-linear equalization may include adapting parameters of the non-linear equalization based on cross-entropy.

In a fourth implementation of such a method, performing front-end filtering may include performing FIR filtering.

A fifth implementation of such a method may further include scalably bypassing the non-linear filtering for controllably outputting an output of the front-end filtering as at least a portion of output of the non-linear equalization.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which:

FIG. 2 is a plot of an exclusive-OR function in a Cartesian coordinate space illustrating a problem solved by implementations of the subject matter of this disclosure;

FIG. 3 is a plot of a transformation of the exclusive-OR function of FIG. 2 into a different coordinate space illustrating a solution based on implementations of the subject matter of this disclosure;

DETAILED DESCRIPTION

Figure 1:
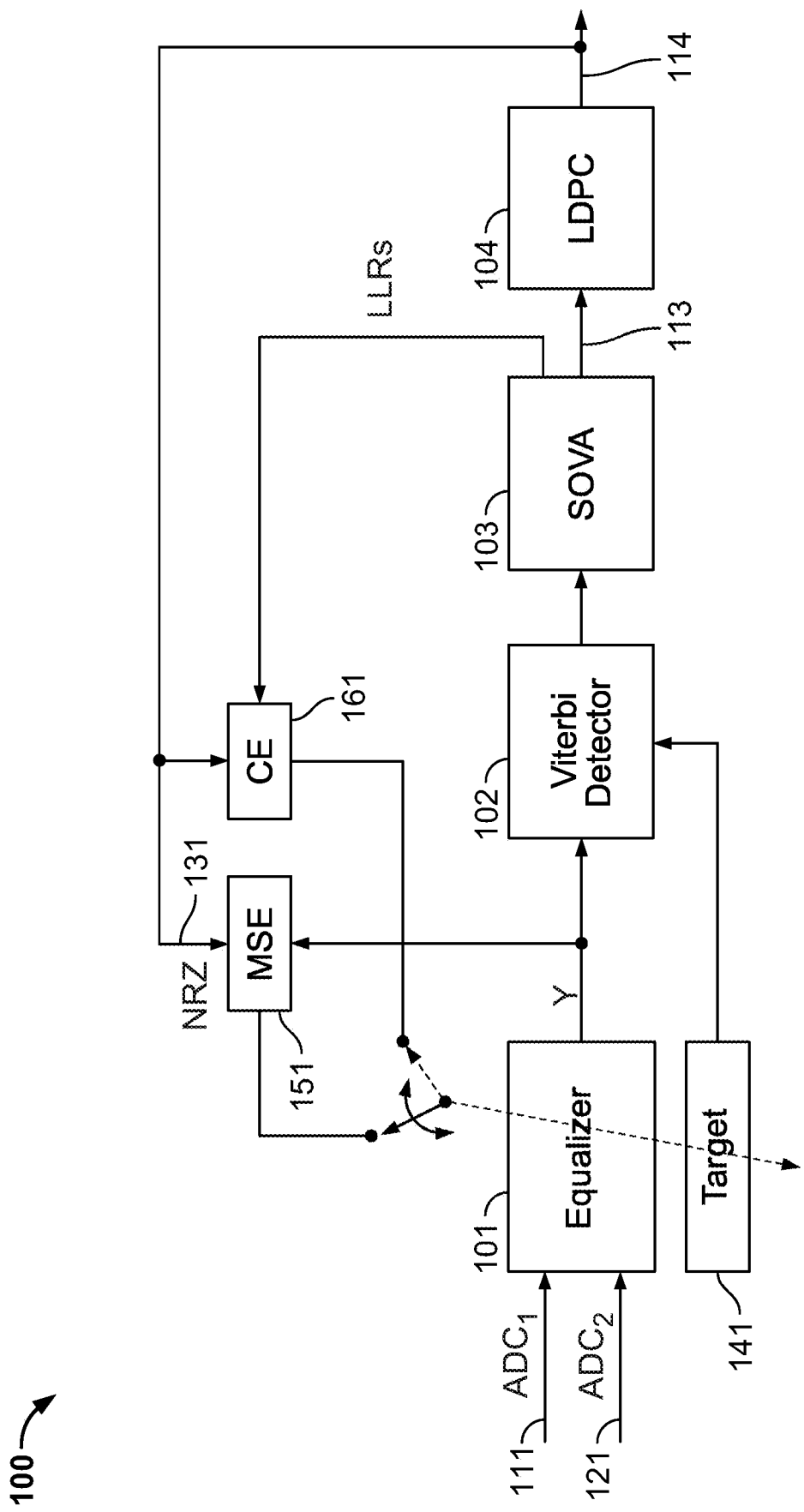
FIG. 1 illustrates a TDMR detector channel as one example of a channel with which implementations of the subject matter of this disclosure may be used.

As noted above, integrated circuit devices may include high-speed SERDES links between various device components. Typical SERDES links may suffer from significant non-linearity or channel impairment in the signal path, as a result of, e.g., insertion loss, inter-symbol-interference (ISI), and, in an optical system, non-linearities such as dispersion loss or, in a copper (i.e., wired) system, cross-talk, jitter, etc. Various forms of linear equalization typically are used, at the receiver end of such links, to attempt to deal with such channel impairments.

Similarly, in magnetic recording, reading and writing are performed by a head of a hard disk drive that moves relative to the surface of a storage medium and writes data to, or reads data from, circular data tracks on a magnetic disk. In order to increase recording densities, it is desirable to shrink the bit cell, or area of disk surface in which a single bit is recorded. Shrinking the bit cell, however, increases intersymbol interference (ISI) from data recorded on the media, thereby increasing the bit error rate (BER) and decreasing the reliability of read-back data. An increased BER also effectively reduces the rate at which data can be read back, owing to the overhead inherent in error-detection or error-correction techniques employed to compensate for the increased BER, and/or owing to repeat read-back attempts that may be necessary in order to accurately read-back data after erroneous data read-back attempts.

Two-dimensional magnetic recording (TDMR) is another technique that has been developed in an effort to increase storage capacity in hard disk drives. TDMR employs a read-back technique that allows for greater storage capacity by combining signals simultaneously obtained from multiple read-back heads to enhance the accuracy of reading back data from one or more data tracks. A TDMR read-back channel typically includes a linear equalizer to mitigate the negative impact that noise has on the read-back channel signal integrity, and on the accuracy and reliability in reading back digital data values from the storage medium. Some TDMR read-back channels utilize minimum-mean-squared-error (MMSE) as a cost function to adapt the equalizer to further improve BER performance.

However, linear equalization may not be sufficient to compensate for such non-linearities or interference. Linear equalization may not be enough to correctly assign received samples near the threshold between levels to the correct written bit or symbol when the signal-to-noise ratio is low.

In accordance with implementations of the subject matter of this disclosure, non-linear equalization is used to compensate for non-linearities in a high-speed data channel, such as a SERDES channel, or a disk-drive read channel, thereby reducing the bit-error rate (BER). In different implementations, different types of non-linear equalizers may be used.

Conceptually, a linear equalizer performs the separation of samples for assignment to one level or another by effectively drawing a straight line between groups of samples plotted in a two-dimensional (e.g., (x,y)) space. In channels that are insufficiently linear, or where the levels are too close together, there may not be a straight line that can be drawn between samples from different levels on such a plot. A non-linear equalizer effectively re-maps the samples into a different space in which the samples from different levels may be separated by a straight line or other smooth curve.

A non-linear equalizer in accordance with implementations of the subject matter of this disclosure may be more or less complex. For example, a non-linear equalizer may have more or fewer variables, or taps, with complexity being proportional to the number of variables. In addition, a non-linear equalizer that operates at the bit level—i.e., operates separately on the bits of each symbol (e.g., two bits/symbol for four-level signaling in a data channel) rather than on the symbol as a whole—may be less complex than a non-linear equalizer that operates at the symbol level. Either way, greater complexity yields greater performance when all other considerations are equal. However, greater complexity also may require greater device area and/or power consumption.

Types of non-linear equalizers that may be used in accordance with the subject matter of this disclosure may include forms of reduced-complexity multi-layer perceptron neural network (RC-MLPNN) equalizers and forms of reduced-complexity radial-basis-function neural network (RC-RBFNN) equalizers.

Performance of the non-linear equalizer may be affected by the cost function used for adaptation of the equalizer. Implementations of the subject matter of this disclosure reduce the complexity of a non-linear equalizer whether it uses any one of various different cost functions for adaptation, including either a minimum mean-square error (MMSE or MSE) cost function, or a cross-entropy (CE)-based cost function. A CE-based cost function may yield a better result than an MMSE cost function, but a CE-based cost function is more complex than an MMSE cost function.

According to implementations of the subject matter of this disclosure, a non-linear equalizer with reduced complexity but comparable performance is provided by appending, to a non-linear neural network equalizer, a front-end filter to reduce complexity of the inputs to the non-linear equalizer. For example, a finite-impulse-response (FIR) filter may be used as a front end to reduce complexity of the non-linear equalizer by reducing the number of input parameters or dimensions.

The subject matter of this disclosure may be better understood by reference to FIGS. 1-13.

FIG. 1 illustrates a TDMR detector channel 100 as one example of a channel with which implementations of the subject matter of this disclosure may be used. However, as noted above, implementations of the subject matter of this disclosure also may be used with other forms of high-speed data channels such as a SERDES channel (not shown).

In TDMR detector channel 100, respective analog-to-digital converter (ADC) outputs 111, 121 from two separate read heads (not shown) are input to an equalizer 101 for equalization according to implementations of the subject matter of this disclosure. Output Y of equalizer 101 is then passed to Viterbi detector 102, the output of which is then passed to a soft-output Viterbi algorithm (SOVA) detector 103. SOVA detector 103 provides log-likelihood ratios (LLRs) 113 to a decoder, such as a low-density parity check (LDPC) decoder 104 which decodes the bits. LLRs 113 also are fed back to equalizer 101 which is adapted using either a mean-square error (MSE) cost function 151 or a cross-entropy cost function 161 which compares the LLRs 113 to output bits 114 (which are expressed as non-return-to-zero data 131), to set a target 141.

The purpose of implementing equalization on channel 100 is to correct for various sources of interference referred to above and thereby effectively move samples that are on the wrong side of a detection threshold (whether for bits read from a storage medium or signal levels in a SERDES channel) to the correct side of the threshold. Linear equalization effectively takes a plot of the samples in a two-dimensional (x,y) space and draws a straight line through the samples where the threshold ought to be. However, in a channel with non-linearities, there may be no straight line that can be drawn on that two-dimensional plot that would correctly separate the samples. In such a case, non-linear equalization can be used. A non-linear equalization function may effectively remap the samples into a different space in which there does exist a straight line that correctly separates the samples.

Alternatively, the non-linear equalization function may remap the samples into a space in which there exists some smooth curve other than a straight line that correctly separates the samples. For example, non-linear equalization using a radial-basis function may remap the samples into a polar-coordinate, or radial, space in which the samples are grouped into circular or annular bands that can be separated by circles or ellipses.

The advantage of non-linear equalization over linear equalization in a non-linear channel may be seen in a simplified illustration as shown in FIGS. 2 and 3, where the signal to be equalized is characterized by the exclusive-OR (XOR or @) function. FIG. 2 is plot of y=x1⊕x2 in (x1,x2) space, where the open dots 201, 202 represent y=0 and cross-hatched dots 203, 204 represent y=1. It is apparent that there is no straight line that can be drawn separating the open dots from the cross-hatched dots.

However, a radial-basis function $$\varphi(r_i) = \varphi(\|x - c_i\|) = e^{-\left\|\begin{bmatrix}x_1\\x_2\end{bmatrix} - c_i\right\|^2}$$

where $c_i$ is the centroid of the $i^{th}$ node, can be used to transform the XOR function from the linear Cartesian (x1, x2) space to a non-linear radial ($\varphi(r1),\varphi(r2)$) space as follows:

| $x_1$ | $x_2$ | $\varphi(r_1)$ | $\varphi(r_2)$ | y |
|---|---|---|---|---|
| 0 | 0 | 0.1353 | 1 | 0 |
| 0 | 1 | 0.3678 | 0.3678 | 1 |
| 1 | 0 | 0.3678 | 0.3678 | 1 |
| 1 | 1 | 1 | 0.1353 | 0 | which is diagrammed in FIG. 3. As can be seen, when mapped into the non-linear radial ($\varphi(r1),\varphi(r2)$) space, the values 301, 302, 303 (as can be seen, both of the two y=1 points 201, 202 in (x1,x2) space map to the same point 301 in ($\varphi(r1),\varphi(r2)$) space) of the XOR function 300 may be separated by straight line 304.

As discussed below, various types of non-linear equalizers are available. Whatever type of non-linear equalizer is used may be adaptive to account for changing channel conditions. Various forms of adaptation may be used.

One type of adaptation function that may be used is minimum mean-squared error (MMSE), where the mean-squared error (MSE) is defined as the square of the norm of the difference between the equalized signal (Y) and the ideal signal (Y). The equalizer may initially be adapted in a training mode in which the ideal signal values are available. Later, during run-time operation, the detected output values of the equalized channel should be close enough to the ideal values to be used for adaptation.

Another type of adaptation function that may be used is the cross-entropy (CE) between a training bit and its log-likelihood ratio (LLR). In particular, cost function circuitry may be configured to compute a cross-entropy value indicative of a difference between a probability distribution of the detected bit value (which is a function of the LLR signal) and a probability distribution of the training bit value. The cost function circuitry then adapts the equalizer by setting an equalizer parameter (e.g., one or more coefficients of filter taps of the equalizer) to a value that corresponds to a minimum cross-entropy value from among the computed cross-entropy value and one or more previously computed cross-entropy values, to decrease a bit-error rate for the channel. As in the case of MSE equalization, the equalizer may initially be adapted in a training mode in which the ideal signal values are available. Later, during run-time operation, the detected output values of the equalized channel should be close enough to the ideal values to be used for adaptation. Specifically, if any forward error correction code (FEC) decoder (e.g., a Reed Solomon (RS) decoder or Low-Density Parity Check (LDPC) decoder) is available after the equalizer, then successfully decoded frames from the FEC decoder output may be used for adaptation.

LLR may be defined as the relationship between the probability ($P_0$) of a bit being '0' and the probability ($P_1$) of a bit being '1':

$$LLR = L = \log\left(\frac{P_1}{P_0}\right)$$

$$P_1 + P_0 = 1$$

$$P_0 = \frac{1}{(1+e^L)}$$

$$P_1 = \frac{e^L}{(1+e^L)}$$

The cross-entropy between a training bit and its LLR may be computed as follows:

$$\text{Cross Entropy}(bit, LLR) = -P(bit = 0) \cdot \log(P_0) - P(bit = 1) \cdot \log(P_1)$$

$$\text{Cross Entropy}(bit, LLR) = -(1 - bit) \cdot \log(P_0) - bit \cdot \log(P_1)$$

$$\text{Cross Entropy} = \text{Inf} \text{ when} \begin{cases} bit = 0, P_0 = 0 \\ bit = 1, P_1 = 0 \end{cases}$$

$$\text{Cross Entropy} = 0 \text{ when} \begin{cases} bit = 0, P_0 = 1 \\ bit = 1, P_1 = 1 \end{cases}$$

When the true bit is a logic '0' but the probability of the detected bit represented by the LLR indicates that $P_0=0$, or the true bit is a logic '1' but the probability of the detected bit represented by the LLR indicates that $P_1=0$, then the true value is the complete opposite of the expected value, meaning that cost (cross-entropy) approaches infinity. On the other hand, when the probability of a detected bit value as indicated by the LLR agrees with the true bit value, then cross-entropy equals zero. Insofar as in most cases both probabilities $P_0$ and $P_1$ are higher than 0 and lower than 1, cross-entropy will be a finite non-zero value. Thus, this cost function can be used for adaptation and reflects the quality of the detected bits, with the goal being to minimize cross-entropy.

The gradient of cross-entropy with respect to the LLR may be computed by substituting for $P_0$ and $P_1$ in the cross-entropy equation:

$$\frac{\partial(CE)}{\partial(LLR)} = P_1 - bit = \begin{cases} P_1 & \text{when } bit = 0 \\ P_1 - 1 = -P_0 & \text{when } bit = 1 \end{cases}$$

The LLR may be adapted to minimize cross-entropy (i.e., $$\frac{\partial(CE)}{\partial(LLR)} = 0$$

), as follows:

$$LLR_{t+1} = LLR_t - \alpha \cdot P_1 \text{ if bit=0}$$

$$LLR_{t+1} = LLR_t + \alpha \cdot P_0 \text{ if bit=1}$$

A negative LLR means bit=0 has a higher probability than bit=1, while a positive LLR means bit=1 has a higher probability than bit=0. In these equations, $P_0$ and $P_1$ are probabilities and therefore are positive values, and a is an adaptation bandwidth which also is positive. Therefore, when the true bit=0 then adaptation using cross-entropy will make a negative LLR more negative, and when the true bit=1 then adaptation using cross-entropy will make a positive LLR more positive. Therefore, cross-entropy-based adaptation maximizes the magnitude of the LLR and hence is a maximum-likelihood adaptation which reduces BER. Thus, adaptation of the equalizer to minimize cross-entropy also minimizes BER.

If one assumes that there is a general computation graph from parameter X→Y→LLR→CE such that parameter X affects the value of output Y which affects the LLR, from which the cross-entropy may be computed, then the cross-entropy gradient can be expressed in terms of other parameters:

$$\frac{\partial(CE)}{\partial(\text{parameter}_X)} = \frac{\partial(\text{parameter}_Y)}{\partial(\text{parameter}_X)} \cdot \frac{\partial(LLR)}{\partial(\text{parameter}_Y)} \cdot \frac{\partial(CE)}{\partial(LLR)}$$

Therefore, any parameter can be adapted to minimize the cross-entropy.

Figure 4:
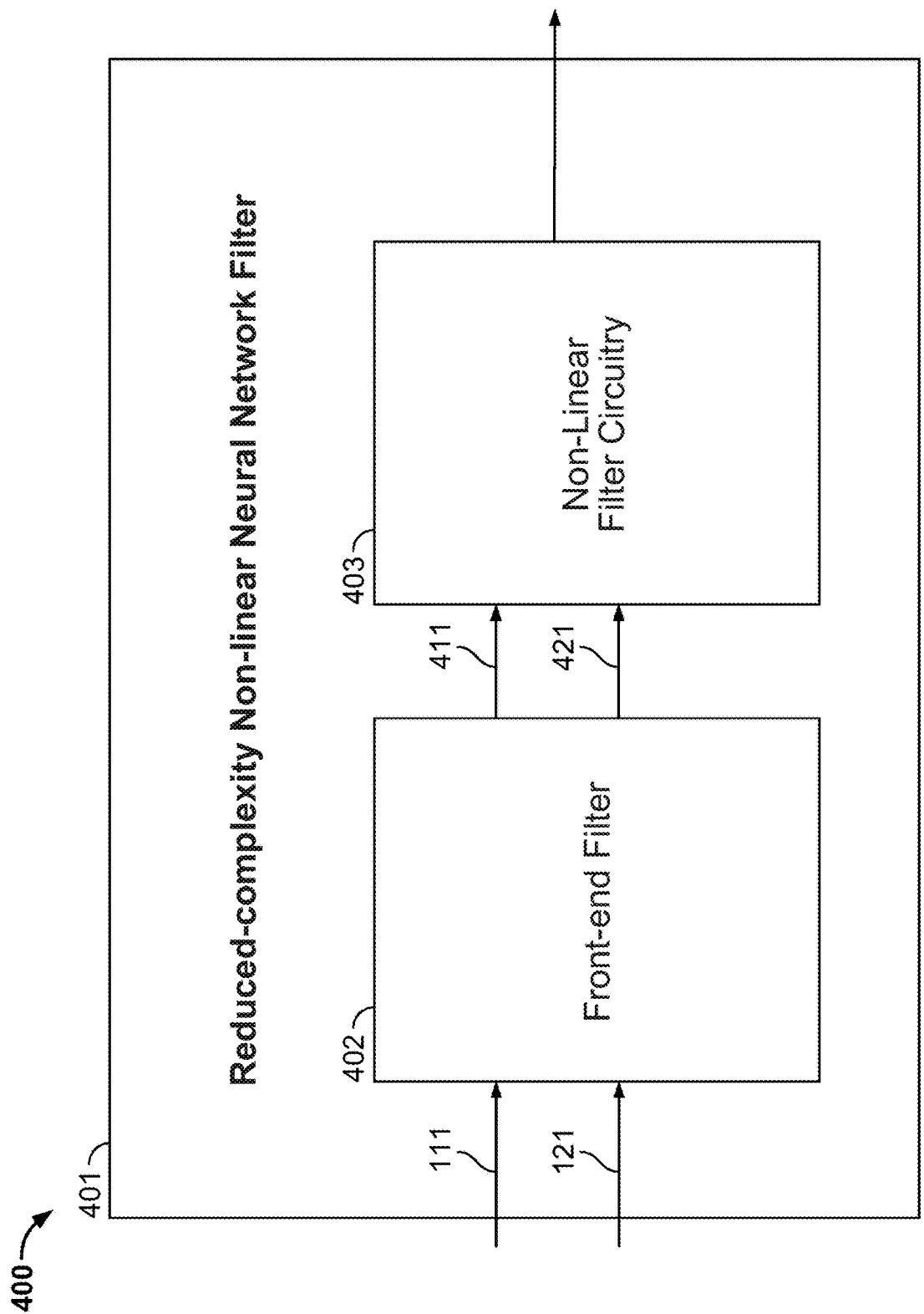
FIG. 4 is a schematic representation of a general implementation of a reduced-complexity non-linear neural network filter in accordance with the subject matter of this disclosure.

FIG. 4 shows a general implementation 400 of a reduced-complexity non-linear neural network filter 401 in accordance with the subject matter of this disclosure for equalizing the two ADC outputs 111, 121 in the TDMR read channel 100 of FIG. 1. Reduced-complexity non-linear neural network filter 401 accepts inputs 111, 121 of a certain complexity, but initially filters inputs 111, 121 through a front-end filter 402 to reduce the complexity of inputs 111, 121, before filtering reduced-complexity inputs 411, 421 through non-linear filter circuitry 403. Reduction of the complexity of inputs 411, 421 allows a reduction in the complexity (as measured by dimensionality) of non-linear filter circuitry 403, therefore the complexity of non-linear neural network filter 401, without having to reduce the complexity of the inputs 111, 121 being filtered.

Figure 5:
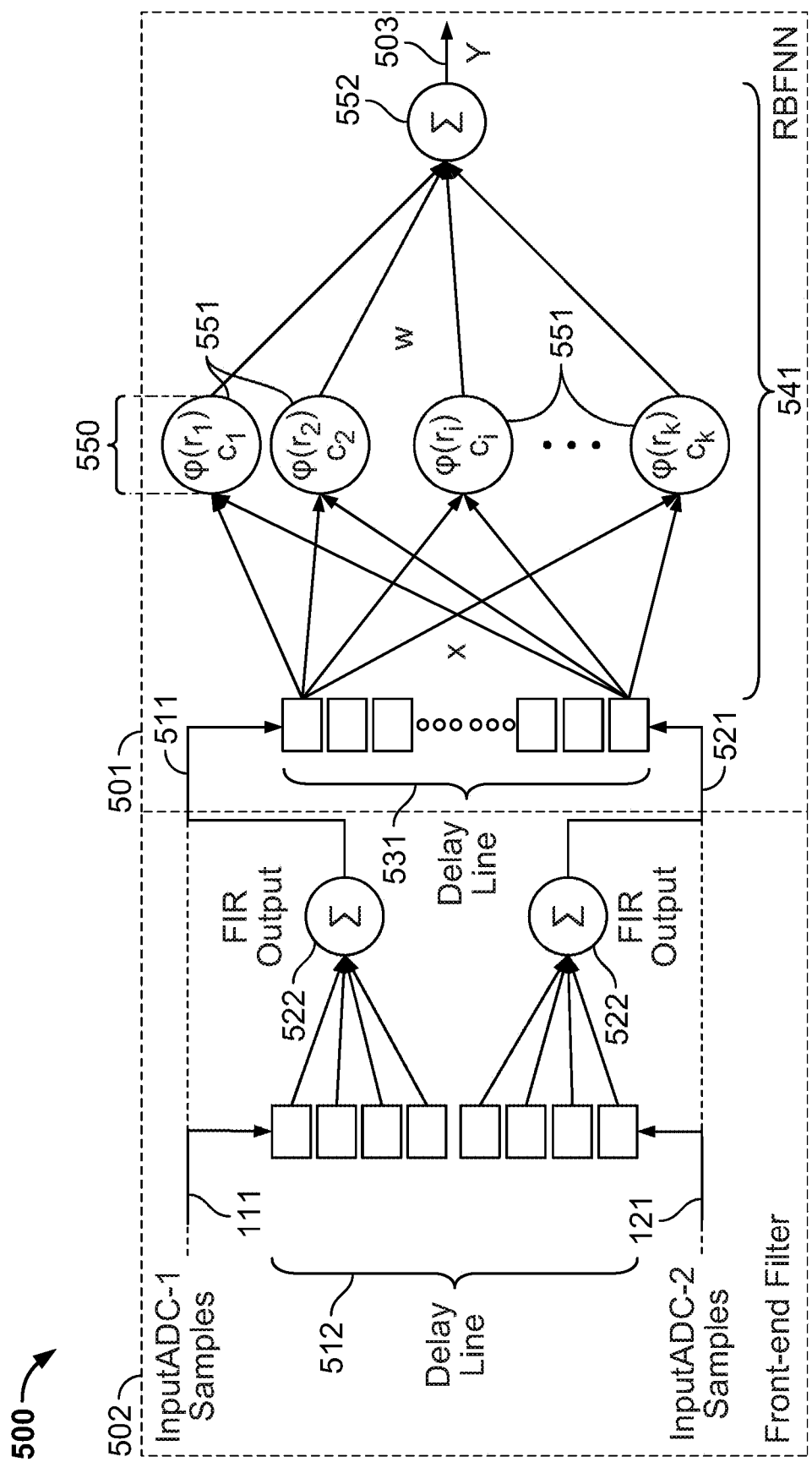
FIG. 5 is a diagram of a first implementation of a reduced-complexity non-linear neural network filter in accordance with the subject matter of this disclosure.

A first implementation of a reduced-complexity non-linear neural network filter 500, shown in FIG. 5, is based on a radial-basis function non-linear neural network filter 501, with a finite-impulse-response-(FIR)-based front-end filter 502.

In radial-basis function non-linear neural network filter 501, digital samples from two inputs 511, 521 are delayed by delay line 531 and combined in radial-basis function non-linear neural network 541. As seen in FIG. 5, radial-basis function non-linear neural network 541 includes at least one hidden layer 550 of hidden nodes 551. Each hidden node 551 operates on each delayed sample with a radial-basis function, but to avoid crowding the drawing only some delays in delay line 531 are shown as being coupled to each hidden node 551. The outputs of hidden layer 550 are combined (e.g., by addition) at 552 to provide Y output 503.

Each sample input at 511, 521 adds a parameter or dimension to radial-basis function non-linear neural network filter 501, increasing filter complexity. In order to reduce the complexity of radial-basis function non-linear neural network filter 501, reduced-complexity non-linear neural network filter 500 includes front-end filter 502, which combines some of the inputs from ADC outputs 111, 121 to provide a reduced number of inputs 511, 521 to radial-basis function non-linear neural network filter 501. As can be seen in FIG. 5, in this implementation, front-end filter 502 uses FIR filtering (each line connecting a delay 512 to sum 522 represents multiplication of a sample by a coefficient (not shown), forming a filter tap, with the taps being summed at 522) to combine, e.g., every four input samples from ADC outputs 111, 121 into one input sample 511, 521. This allows a reduction in the complexity (as measured by dimensionality) of radial-basis function non-linear neural network filter 501, and therefore the complexity of non-linear neural network filter 500, without having to reduce the complexity of the inputs 111, 121 being filtered. The unseen coefficients may be parameters that adapted with a back-propagation algorithm and, for example, may be derived from the equation set forth above in connection with the cross-entropy gradient.

In the implementation of FIG. 5, each set of input samples 111, 121 is processed in a separate portion of delay line 512, and in a separate portion of delay line 531. In this implementation, with two sets of input samples (from the two read heads of TDMR channel 100), each delay line is divided into two segments. However, more generally, the number of segments corresponds to the number of input sets. Thus, for a single input set, there would be only one segment (i.e., the delay line would not be segmented) but if there were three inputs sets, the delay line may be divided into three segments, etc.

Figure 6:
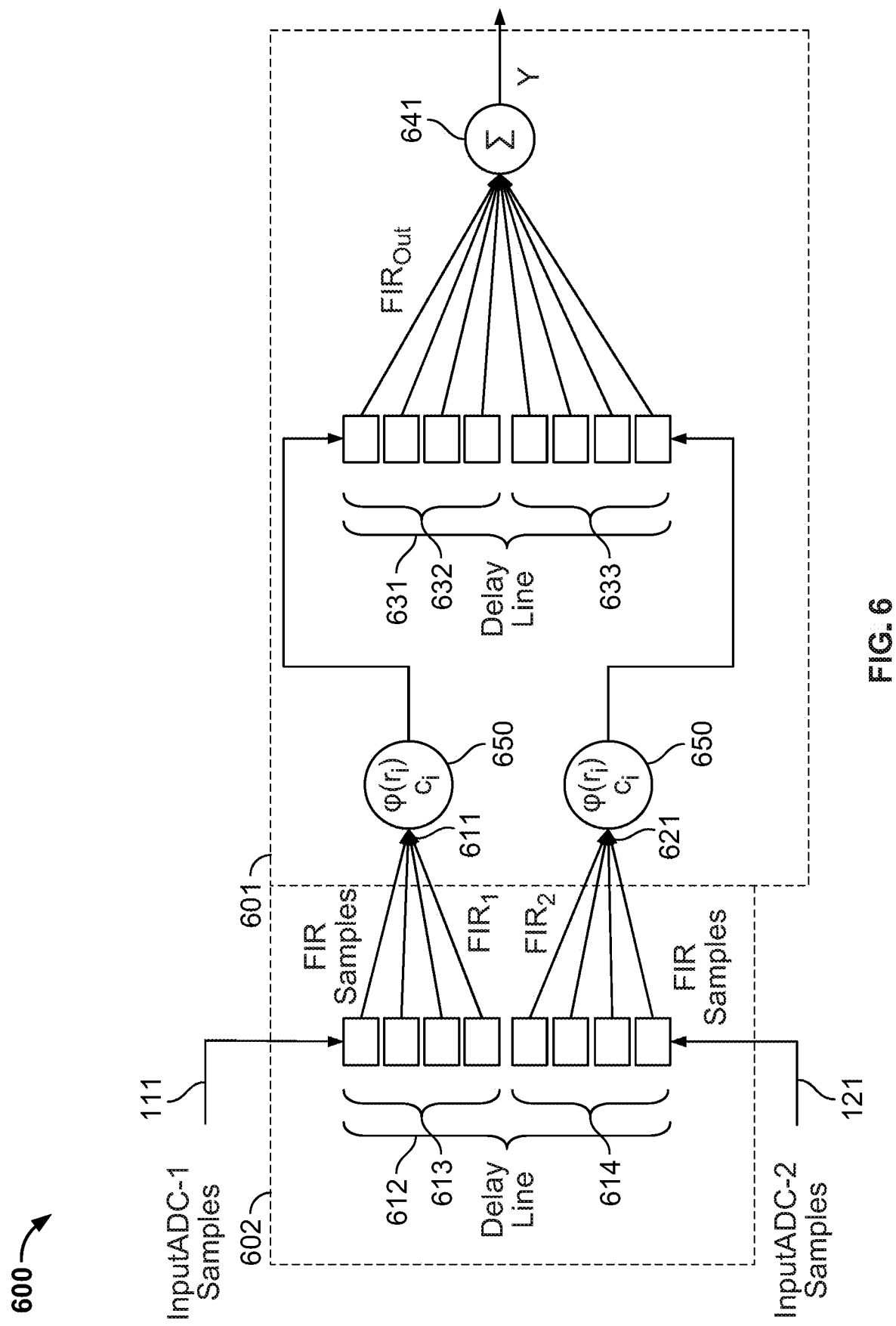
FIG. 6 is a diagram of a second implementation of a reduced-complexity non-linear neural network filter in accordance with the subject matter of this disclosure.

A second implementation 600 of a reduced-complexity non-linear neural network filter, shown in FIG. 6, also is based on a radial basis filter neural network filter 601, with a finite-impulse-response-(FIR)-based front-end filter 602. As in the case of front-end filter 502, front-end filter 602 uses FIR filtering (each line connecting a delay 612 to radial basis function 611, 621 represents multiplication of a sample by a coefficient (not shown; see discussion above in connection with FIG. 5) forming a filter tap) to combine, e.g., every four input samples from ADC outputs 111, 121 into one input sample 611, 621, thereby allowing a reduction in the complexity (as measured by dimensionality) of radial-basis function non-linear neural network filter 601, therefore the complexity of non-linear neural network filter 600, without having to reduce the complexity of the inputs 111, 121 being filtered.

However, in this implementation, rather than being summed, the taps of delay line 612 are input directly to the hidden nodes 650 of radial-basis function non-linear neural network filter stage 601, which in this implementation are upstream of delay line 631.

Once again, with inputs 111, 121 from two sources, half 613 of delay line 612 of front-end filter 602 is devoted to input 111, while half 614 of delay line 612 of front-end filter 602 is devoted to input 121, with one respective hidden node 650 of radial-basis function non-linear neural network filter stage 601 for each input source 111, 121. The same is true of delay line 631 within radial-basis function non-linear neural network filter stage 601, with separate halves 632, 633 of delay line 631 devoted to inputs deriving separately from inputs 111, 121. Here too, the delays 631 form individual taps of a final FIR filter, which are combined at summation node 641 to yield the output Y.

Figure 7:
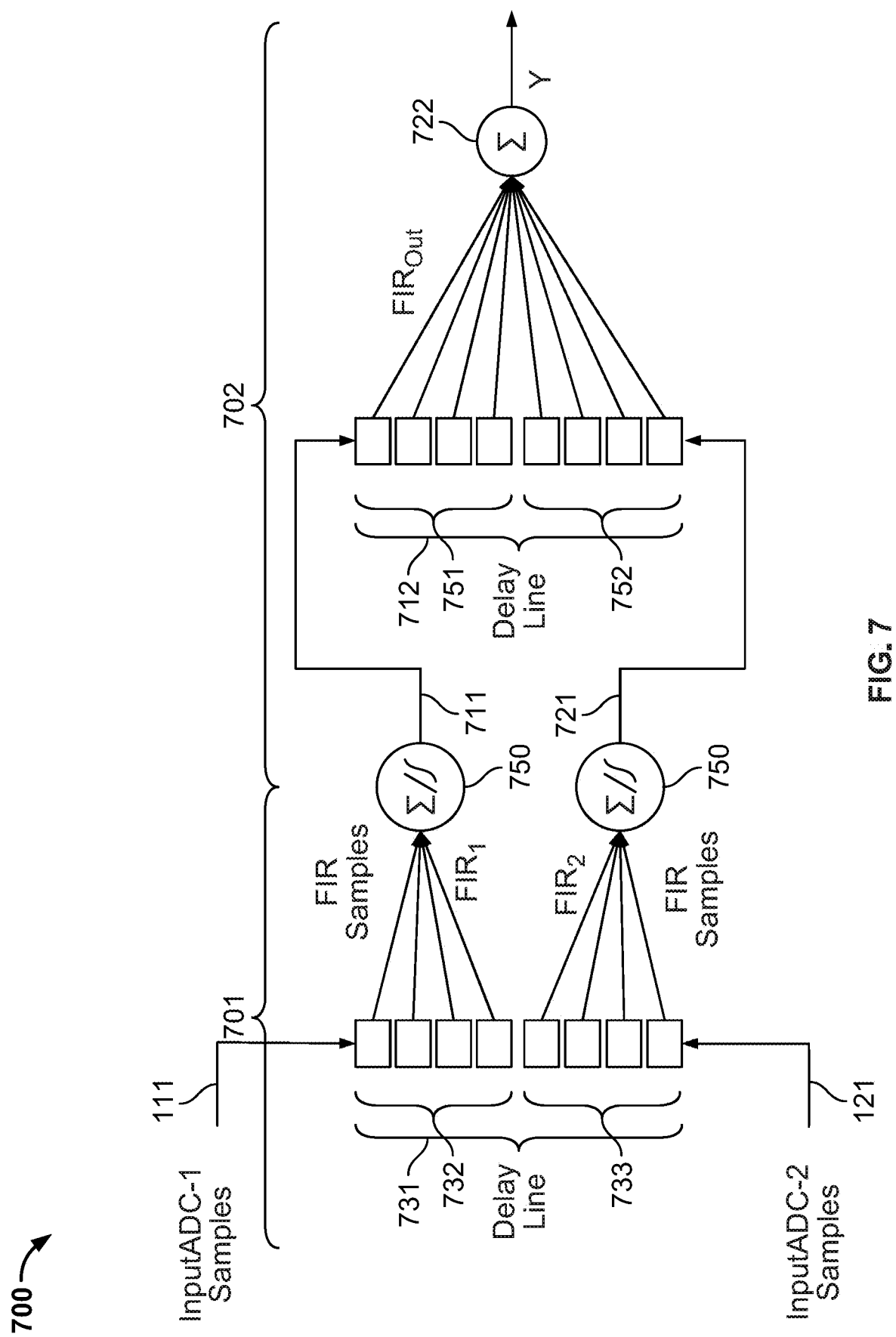
FIG. 7 is a diagram of a third implementation of a reduced-complexity non-linear neural network filter in accordance with the subject matter of this disclosure.

A third implementation of a reduced-complexity non-linear neural network filter 700, shown in FIG. 7, is based on a multilayer perceptron (MLP) non-linear neural network filter 702, with a finite-impulse-response-(FIR)-based front-end filter 701.

Typically, an MLP filter includes a delay line for input samples, followed by at least one hidden layer in which the samples are summed and then passed through a non-linear activation function such as, e.g., a hyperbolic tangent function tanh ($f$), followed by a layer including one or more summations.

In finite-impulse-response-(FIR)-based front-end filter 701, delay line 731 is divided into a first portion 732 receiving inputs 111 and a second portion 733 receiving inputs 121. Each line connecting a delay 731 to one of hidden nodes 750 represents a multiplication of a sample by a coefficient (not shown; see discussion above in connection with FIG. 5) forming a FIR filter tap. The taps are summed by the summation portion of each hidden node 750, which includes a summation function followed by a non-linear activation function which in this implementation is a tanh ($f$) function. Although the hidden layer is shown as having only one hidden node 750 for all of the inputs in each respective set of inputs 111, 121, in other implementations (not shown) there may be multiple nodes 750 for each set of inputs 111, 121. In any event, a set of outputs 711 is generated based on front-end filtering of inputs 111, and another set of outputs 721 is generated based on front-end filtering of inputs 121.

In this implementation, the boundary between the front-end filter 701 and the MLP non-linear neural network filter 702 runs through the hidden layer of hidden nodes 750, but that is not necessarily the case in all implementations.

MLP non-linear neural network filter 702 in this implementation includes a respective tanh ($f$) non-linear activation function as part of each respective one of hidden nodes 750 and a FIR filter formed by a delay line 712 and a summation node 722. A portion 751 of delay line 712 receives output samples 711 from front-end filter 702, while a portion 752 of delay line 712 receives output samples 721 from front-end filter 701. Each line connecting a delay 712 to sum 722 represents a multiplication of a sample by a coefficient (not shown; see discussion above in connection with FIG. 5) forming a FIR filter tap, and the taps are combined at summation node 722 to yield the output Y.

Figure 8:
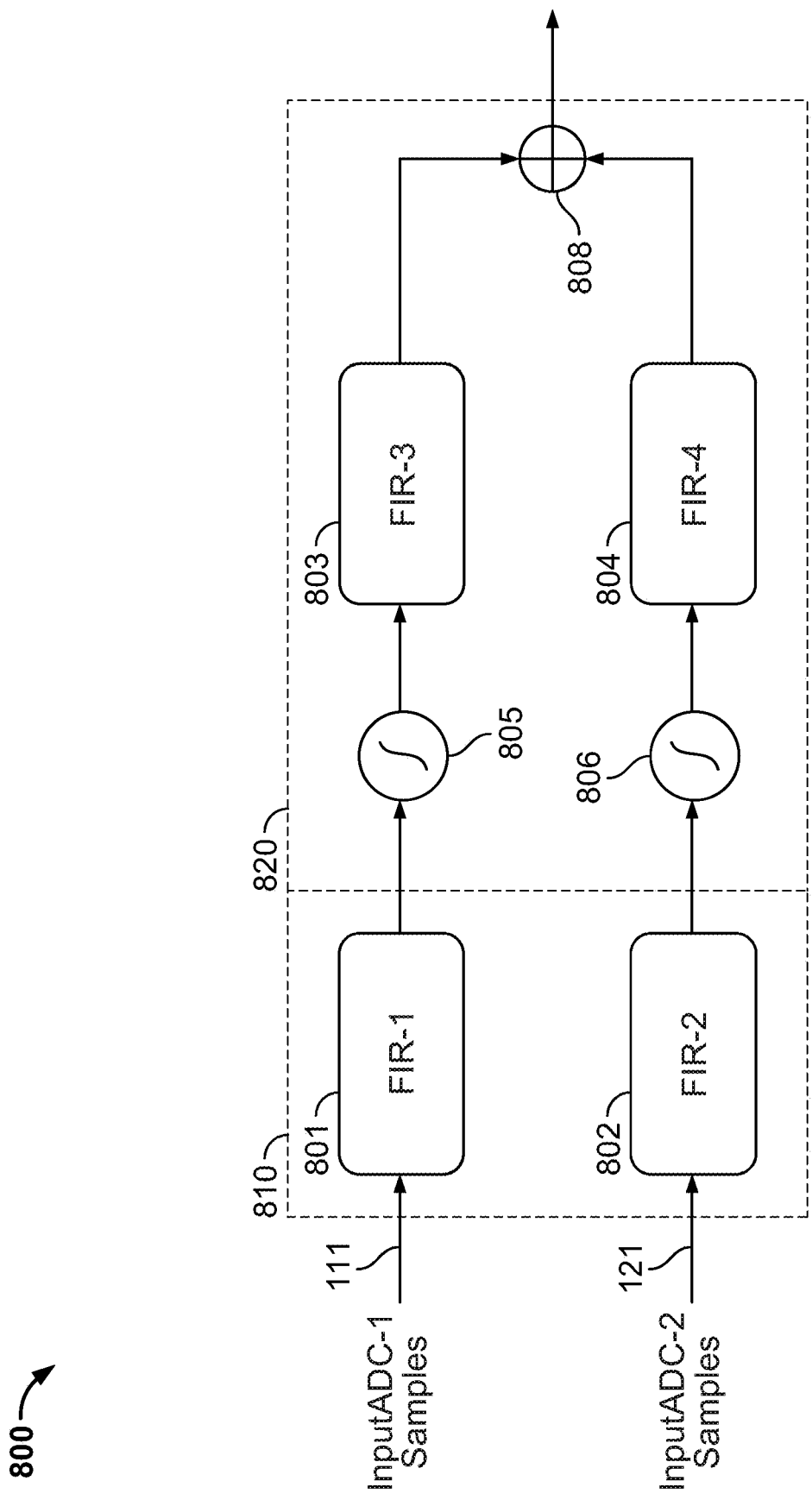
FIG. 8 is an alternative representation of the implementation of the reduced-complexity non-linear neural network filter shown in FIG. 7.

Reduced-complexity non-linear neural network filter 700 may be represented as an equivalent filter arrangement 800, shown in FIG. 8. Reduced-complexity non-linear neural network filter 800 includes four FIR filters 801, 802, 803, 804, and two non-linear activation functions 805, 806 (which may be respective tanh ($f$) non-linear activation functions).

FIR filters 801, 802 form finite-impulse-response-(FIR)-based front-end filter 810, with FIR filter 801 receiving inputs 111 while FIR filter 802 receives inputs 121. FIR filters 803, 804 and non-linear activation functions 805, 806 form reduced-complexity non-linear neural network 820. In reduced-complexity non-linear neural network 820, activation function 805 receives the outputs of FIR filter 801 and passes those outputs, after non-linear activation, to FIR filter 803, while activation function 806 receives the outputs of FIR filter 802 and passes those outputs, after non-linear activation, to FIR filter 804. The outputs of FIR filter 803 and FIR filter 804 are combined at summation node 808 to yield the output Y.

Figure 9:
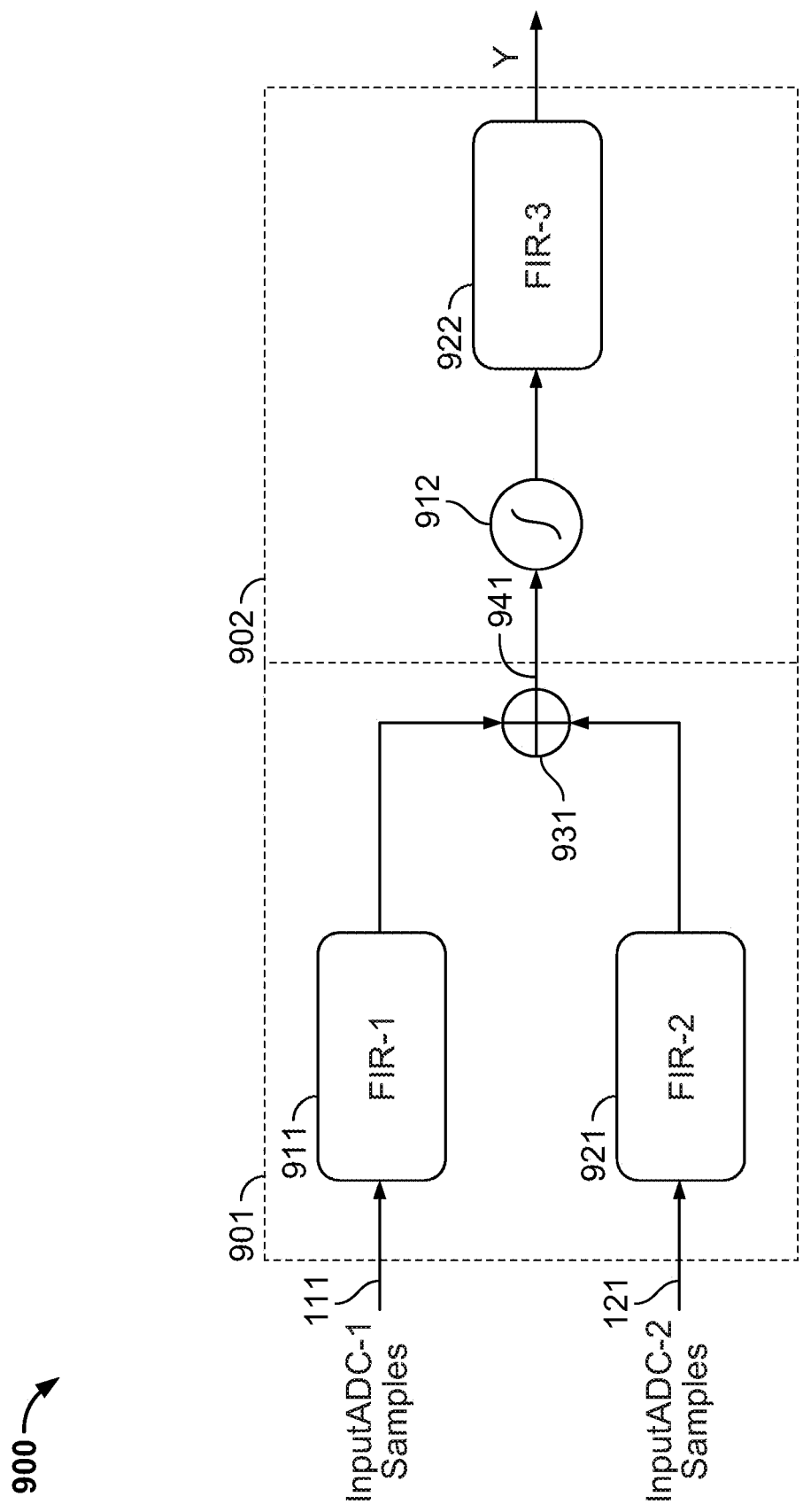
FIG. 9 is a diagram of a fourth implementation of a reduced-complexity non-linear neural network filter in accordance with the subject matter of this disclosure.

Another implementation of a reduced-complexity non-linear neural network filter 900, shown in FIG. 9, also is based on a multilayer perceptron (MLP) non-linear neural network filter 902, with a finite-impulse-response-(FIR)-based front-end filter 901. In this implementation 900, finite-impulse-response-(FIR)-based front-end filter 901 includes two FIR filters 911, 921, each of which filters a respective set of inputs 111, 121. The respective outputs of FIR filters 911, 921 are combined by summation node 931.

The outputs 941 of finite-impulse-response-(FIR)-based front-end filter 901 are then filtered by multilayer perceptron (MLP) non-linear neural network filter 902, which includes a non-linear activation function 912 (which may be a tanh (_) non-linear activation function), followed by FIR filter 922.

Figure 10:
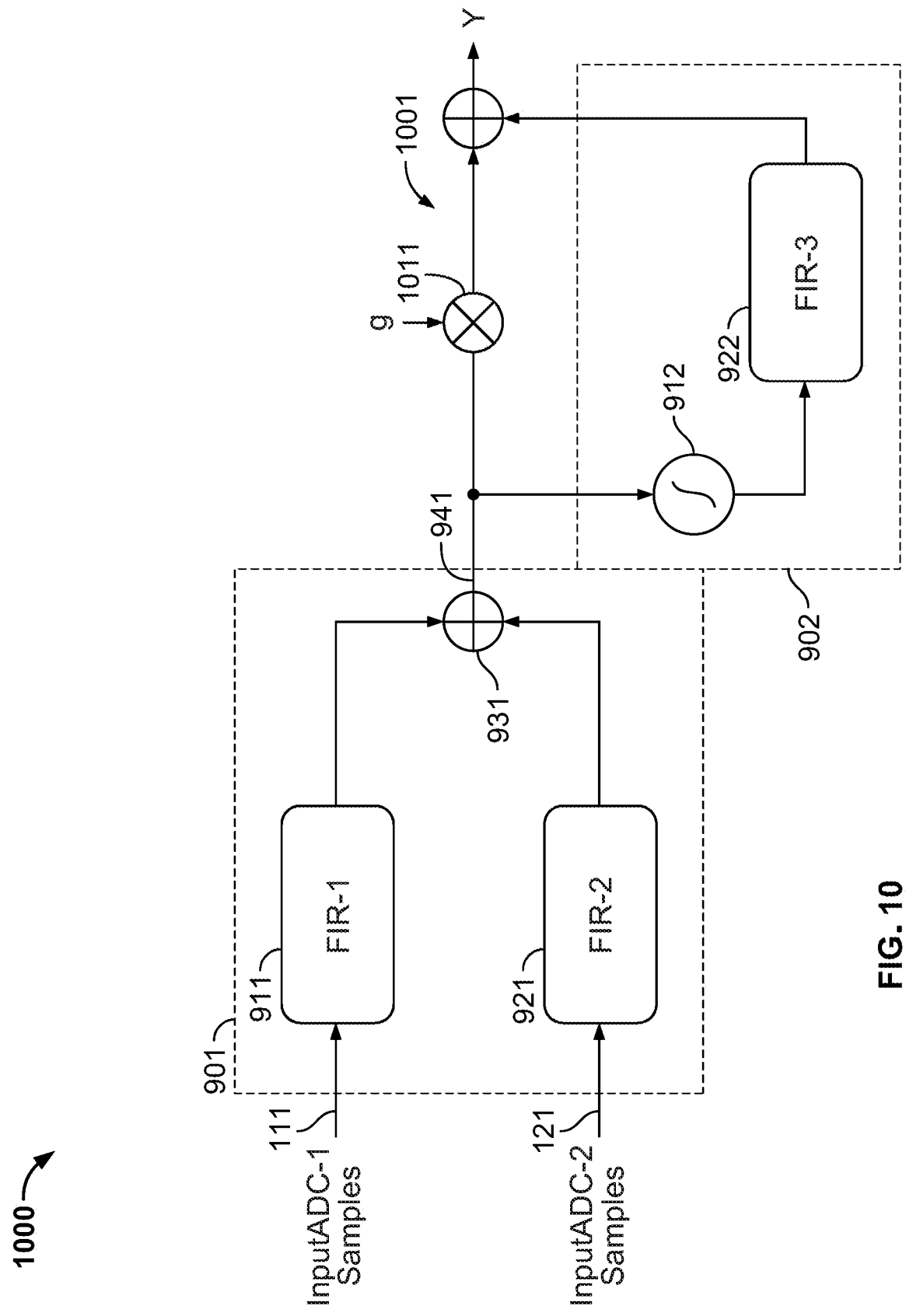
FIG. 10 is a diagram of a fifth implementation of a reduced-complexity non-linear neural network filter in accordance with the subject matter of this disclosure.

In a variation 1000 of reduced-complexity non-linear neural network filter 900, shown in FIG. 10, a scalable bypass path 1001 is provided around non-linear neural network filter 902. Scalable bypass path 1001 is controlled by a scaling factor g (1011). FIR filter 922 inherently includes a similar scaling control. The provision of scalable bypass path 1001 allows several modes of operation. First, if g=0, reduced-complexity non-linear neural network filter 1000 operates identically to reduced-complexity non-linear neural network filter 900. Second, by setting g=1, and setting the scaling factor of FIR filter 922 to 0, reduced-complexity non-linear neural network filter 1000 operates as a linear filter. This linear mode may be used as a "jump start" mode while the non-linear portion of the filter is adapting.

Figure 11:
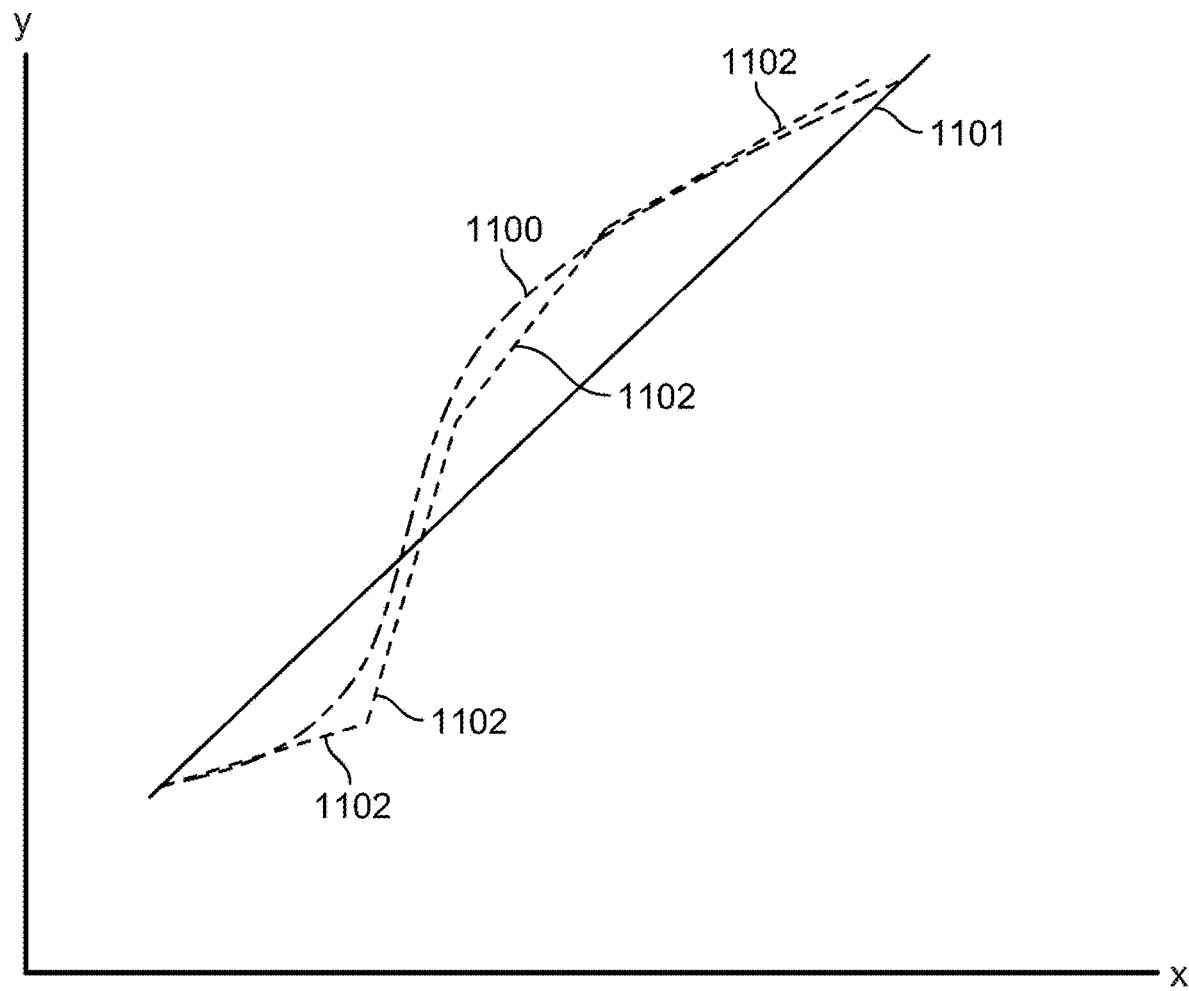
FIG. 11 is a graphical representation of a function to be filtered.

In addition, a non-linear function 1100 (particularly one that is close to a linear function 1101) can be approximated as a series of linear functions 1102 of different slopes, as shown in FIG. 11. By varying g to vary the slopes, non-linear function 1100 can be filtered using mostly finite-impulse-response-(FIR)-based front-end filter 901, which is linear, with non-linear neural network filter 902 correcting for the difference between the segmented linear approximation and the actual non-linear function.

Figure 12:
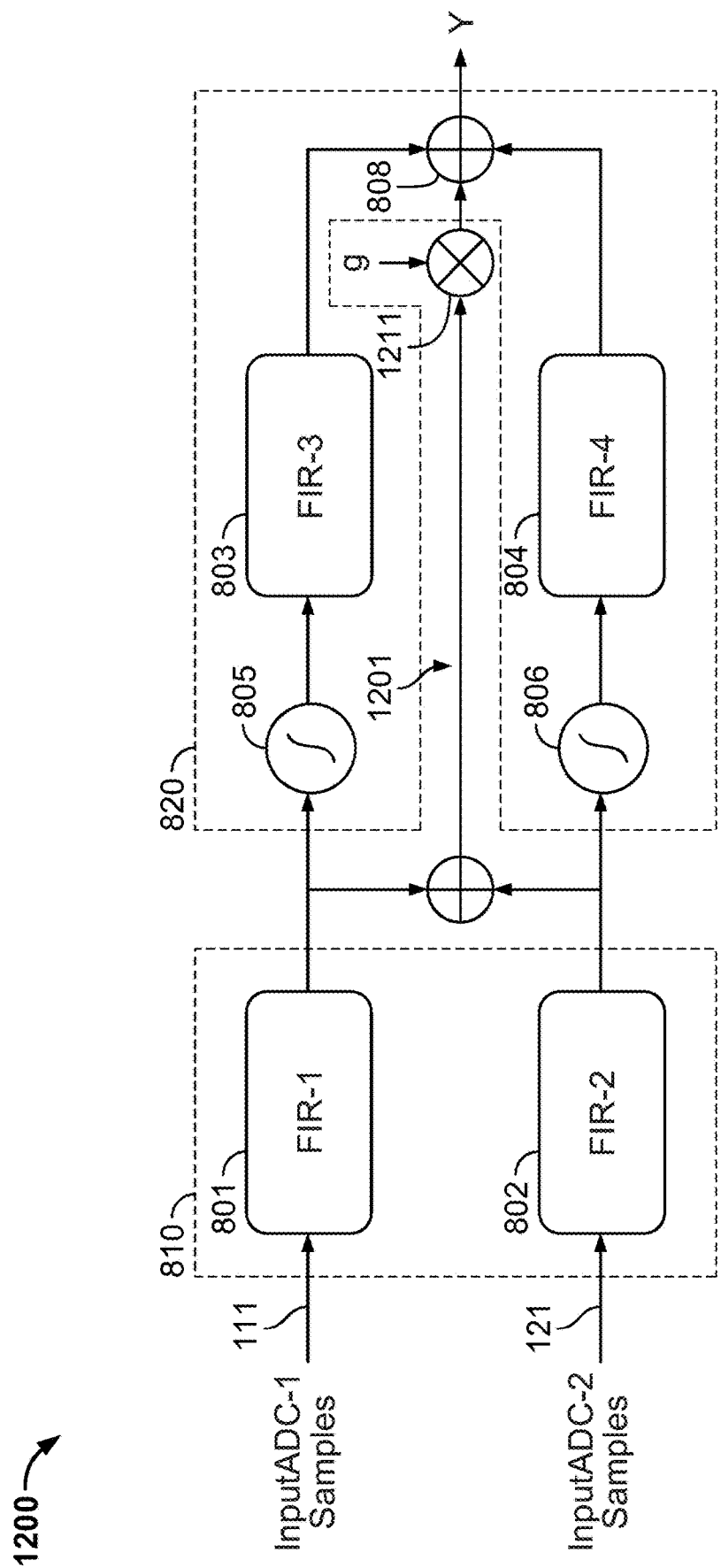
FIG. 12 is a diagram of a sixth implementation of a reduced-complexity non-linear neural network filter in accordance with the subject matter of this disclosure.

A similar variation 1200, based on reduced-complexity non-linear neural network filter 800, is shown in FIG. 12. A scalable bypass path 1201 is provided around non-linear neural network filter 820. Scalable bypass path 1201 is controlled by a scaling factor g (1211). FIR filters 803, 804 of non-linear neural network filter 820 inherently include a similar scaling control. By controlling g at 1211, non-linear neural network filter 1200 can be operated in various modes in a manner similar to non-linear neural network filter 1000.

It can be shown that the various implementations of a reduced-complexity non-linear neural network filter shown above provide nearly as good performance as a non-reduced-complexity non-linear neural network filter, particularly when adapted using cross-entropy. However, the reduced complexity provides substantial savings in device area and power consumption.

Although the implementations shown above receive two inputs (as in the case of a TDMR channel), implementations of the subject matter of this disclosure may include channels with only one input, or with three or more inputs. In such cases, the input delay lines may not be divided into groups (in the case of one input), or may be divided into three or more groups (in the case of three or more inputs), rather than being divided into two groups as shown), with each group receiving samples from one of the inputs.

Figure 13:
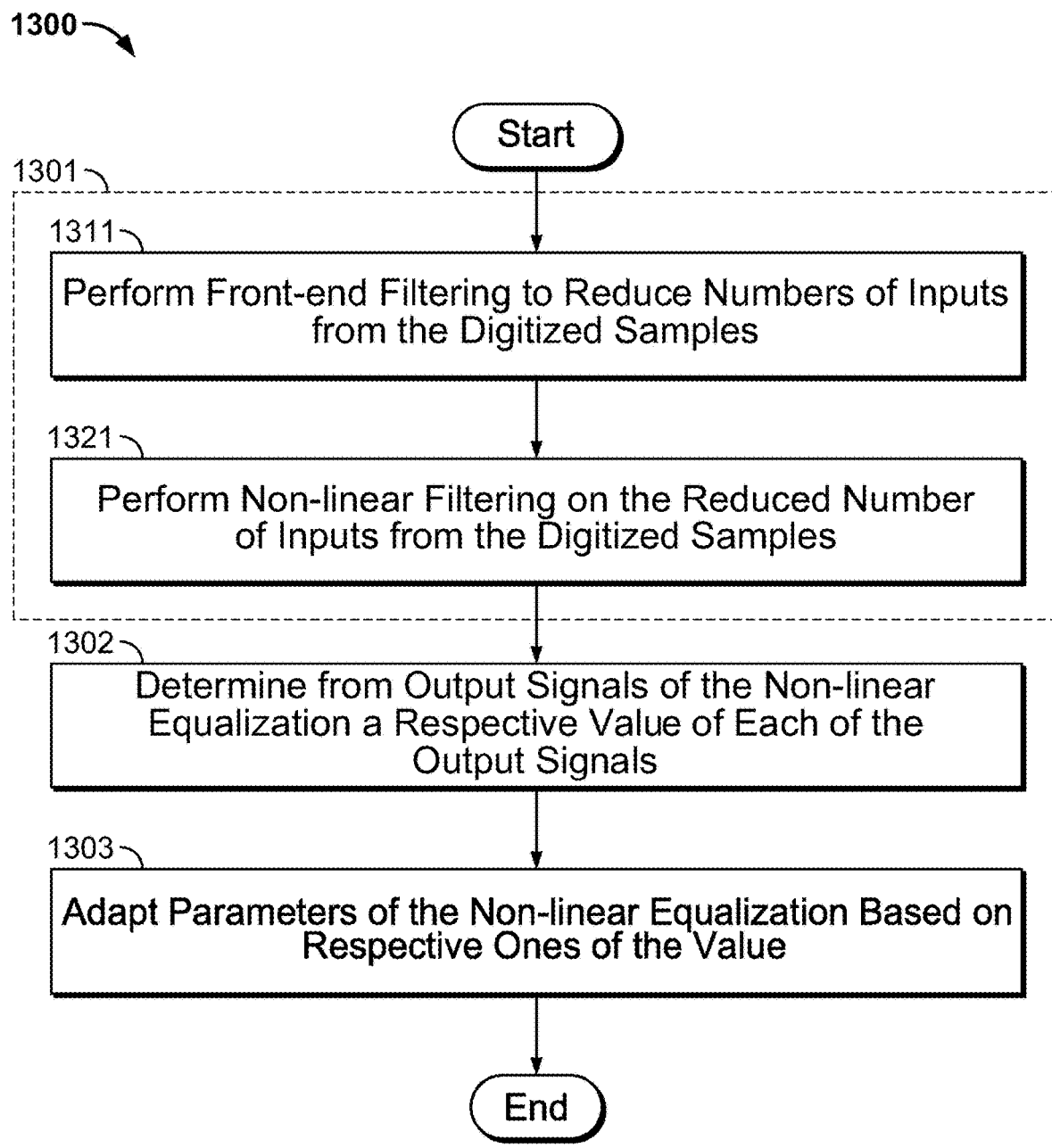
FIG. 13 is flow diagram illustrating a method according to implementations of the subject matter of this disclosure.

A method 1300 according to implementations of the subject matter of this disclosure is diagrammed in FIG. 13.

Method 1300 begins at 1301 where non-linear equalization of digitized samples of input signals on the data channel is performed, including performing front-end filtering at 1311 to reduce numbers of the inputs from the digitized samples, performing non-linear filtering at 1321 on the reduced number of inputs from the digitized samples. At 1302, a respective value of each of the output signals is determined from output signals of the non-linear equalization. At 1303, parameters of the non-linear equalization are adapted based on respective ones of the value, and method 1300 ends.

Thus it is seen that a high-speed data channel using a reduced-complexity non-linear equalizer has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A data channel on an integrated circuit device, the data channel comprising:
   a non-linear equalizer having as inputs digitized samples of signals on the data channel;
   decoding circuitry configured to determine from outputs of the non-linear equalizer a respective value of each of the signals; and
   adaptation circuitry configured to adapt parameters of the non-linear equalizer based on respective ones of the value; wherein:
   the non-linear equalizer includes:
   a front-end filter portion configured to combine some of the inputs from the digitized samples, to provide a reduced number of inputs; and
   a non-linear filter portion configured to operate on the reduced number of inputs.

2. The data channel of claim 1 wherein the non-linear equalizer is a neural network equalizer.

3. The data channel of claim 2 wherein the neural network equalizer is a multi-layer perceptron neural network equalizer.

4. The data channel of claim 3 wherein the multi-layer perceptron neural network equalizer is a reduced complexity multi-layer perceptron neural network equalizer.

5. The data channel of claim 2 wherein the neural network equalizer is a radial-basis function neural network equalizer.

6. The data channel of claim 1 wherein the non-linear equalizer comprises a linear filter and a non-linear activation function.

7. The data channel of claim 6 wherein the non-linear activation function is a hyperbolic tangent function.

8. The data channel of claim 1 wherein the adaptation circuitry adapts parameters of the non-linear equalizer based on cross-entropy.

9. The data channel of claim 1 wherein the front-end filter portion comprises a finite-impulse-response filter.

10. The data channel of claim 1 further comprising scalable bypass circuitry for controllably outputting output of the front-end filter portion as at least a portion of output of the non-linear equalizer.

11. A method for detecting data on a data channel on an integrated circuit device, the method comprising:
   performing non-linear equalization of digitized samples of input signals on the data channel;
   determining from output signals of the non-linear equalization a respective value of each of the output signals; and adapting parameters of the non-linear equalization based on respective ones of the value; wherein:

performing non-linear equalization of digitized samples of input signals on the data channel includes:

performing front-end filtering to combine some of the inputs from the digitized samples, to provide a reduced number of inputs; and performing non-linear filtering on the reduced number of inputs from the digitized samples.

12. The method of claim 11 wherein performing the non-linear equalization comprises performing neural network equalization.

13. The method of claim 12 wherein performing the neural network equalization comprises applying a multi-layer perceptron neural network equalizer.

14. The method of claim 13 wherein performing the neural network equalization comprises applying a reduced complexity multi-layer perceptron neural network equalizer.

15. The method of claim 12 wherein performing the neural network equalization comprises applying a radial-basis function neural network equalizer.

16. The method of claim 11 wherein performing the non-linear equalization comprises applying a non-linear activation function and performing linear filtering on output of the non-linear activation function.

17. The method of claim 16 wherein applying the non-linear activation function comprises applying a hyperbolic tangent function.

18. The method of claim 11 wherein adapting the parameters of the non-linear equalization comprises adapting the parameters of the non-linear equalization based on cross-entropy.

19. The method of claim 11 wherein the performing front-end filtering comprises performing finite-impulse-response filtering.

20. The method of claim 11 further comprising scalably bypassing the non-linear filtering for controllably outputting an output of the front-end filtering as at least a portion of output of the non-linear equalization.

* * * * *